United States Patent
Barrett et al.

(10) Patent No.: US 8,095,611 B2
(45) Date of Patent: Jan. 10, 2012

(54) SIP ENDPOINT ENHANCER

(75) Inventors: Peter Barrett, Cardiff (GB); Chris Boulton, Vale of Glamorgan (GB); Gordon R. Brunson, Broomfield, CO (US); Ian Evans, Cardiff (GB); Joel M. Ezell, Broomfield, CO (US); Gethin Liddell, Cardiff (GB); Harsh V. Mendiratta, Old Bridge, NJ (US); David Shutt, Monmouthshirg (GB)

(73) Assignee: Avaya Inc., Basking Ridge, NJ (US)

( * ) Notice: Subject to any disclaimer, the term of this patent is extended or adjusted under 35 U.S.C. 154(b) by 171 days.

(21) Appl. No.: 12/561,135

(22) Filed: Sep. 16, 2009

(65) Prior Publication Data

US 2011/0066694 A1    Mar. 17, 2011

(51) Int. Cl.
*G06F 15/16* (2006.01)
(52) U.S. Cl. ............... 709/207; 709/227; 709/228
(58) Field of Classification Search .......... 709/207, 709/227, 228
See application file for complete search history.

(56) References Cited

U.S. PATENT DOCUMENTS

| | | | |
|---|---|---|---|
| 5,802,058 A | 9/1998 | Harris et al. | |
| 6,888,828 B1* | 5/2005 | Partanen et al. | 370/389 |
| 2002/0107930 A1* | 8/2002 | Itoh | 709/206 |
| 2004/0003058 A1* | 1/2004 | Trossen | 709/220 |
| 2004/0128344 A1* | 7/2004 | Trossen | 709/203 |
| 2005/0060411 A1 | 3/2005 | Coulombe et al. | |
| 2007/0081518 A1* | 4/2007 | Jain et al. | 370/352 |
| 2007/0171938 A1* | 7/2007 | Sohn et al. | 370/466 |
| 2007/0183411 A1* | 8/2007 | Song et al. | 370/352 |
| 2007/0223523 A1* | 9/2007 | Montpetit et al. | 370/465 |
| 2008/0043720 A1* | 2/2008 | Kucmerowski et al. | 370/352 |
| 2009/0016339 A1* | 1/2009 | Tanizawa et al. | 370/389 |
| 2009/0016377 A1* | 1/2009 | Dahlen | 370/467 |
| 2009/0103518 A1 | 4/2009 | Yu et al. | |
| 2009/0132717 A1* | 5/2009 | Maes | 709/228 |
| 2010/0262702 A1* | 10/2010 | Jin et al. | 709/228 |
| 2011/0055412 A1* | 3/2011 | Kongalath et al. | 709/228 |

FOREIGN PATENT DOCUMENTS

| | | | |
|---|---|---|---|
| CN | 101494656 A | * | 7/2009 |
| EP | 2219330 A1 | * | 8/2010 |
| GB | 2406464 | | 3/2005 |
| WO | WO 2004083994 A2 | * | 9/2004 |
| WO | WO 2009/094932 A1 | * | 8/2009 |

OTHER PUBLICATIONS

Background of the invention for the above-captioned application (previously provided).

Coulombe et al. "Requirements for Message Adaptation in the Context of SIP Instant Messaging and Presence Applications," Internet Engineering Task Force, Oct. 2002, 8 pages.

(Continued)

*Primary Examiner* — Wing Chan
*Assistant Examiner* — Kostas Katsikis
(74) *Attorney, Agent, or Firm* — Sheridan Ross P.C.

(57) ABSTRACT

Methods, devices, and systems are provided for enhancing the functionality of a communication device, such as a communication endpoint. This provides the ability to enhance less intelligent SIP endpoints with required features to support a richer user experience. Furthermore, the endpoint enhancer may be dynamically pluggable onto an existing network device. This provided pluggability allows a network administrator to add a new SEE template to the network without disrupting the network operation or the operation of previously existing SEEs.

23 Claims, 6 Drawing Sheets

OTHER PUBLICATIONS

Boulton et al. "An Extension to the Session Initiation Protocol (SIP) for Endpoint Session View," Internet Engineering Task Force, Mar. 26, 2009, 24 pages.

Extended Euroean Search Report for European Patent Application No. 10175939.7, dated Dec. 3, 2010.

Rosenberg et al., "SIP: Session Initiation Protocol", Network Working Group, available at http://www.ietf.org/rfc/rfc3261.txt, Jun. 2002, 252 pages.

Marjou, "Requirements for a Session Initiation Protocol (SIP) Transparent Back-To-Back User-Agent", available at http://tools.ietf.org/html/draft-marjou-sipping-b2bua-00, Feb. 8, 2007, 11 pages.

* cited by examiner

SIP ENDPOINT ENHANCER

FIELD OF THE INVENTION

The invention relates generally to communications and more specifically to SIP-based communications.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

SIP is a flexible protocol that allows for the optional support of a wide range of features through the use of specific headers, methods and call-flows. With this inherent flexibility in the protocol and the relatively immature state of implementations available (when compared to other long established technologies), it is inevitable that devices will be deployed to a network that cannot take full advantage of all the features available on the network. This is because the devices will not necessarily implement all of the required headers or call flows that the network features require. It is not practical to expect an application to cater to all different types of endpoints and their varying degrees of support for the features offered. It is clear, therefore, that there is a problem in providing a network solution that allows for applications or features of varying complexity to be used by endpoints that do not natively support the call flow or header set required.

An example of this problem involves a solution to a long standing problem with Back-to-Back UAs (B2BUAs). A B2BUA is an often used architecture whereby a B2BUA application is sequenced during call setup into the signalling path between the caller and the callee. It looks like and acts as the real endpoint to both the caller and callee. The problem with this configuration is that a B2BUA may end up hiding the real call information from each endpoint. That is, as the caller endpoint is really in a call with the B2BUA and not with the callee endpoint, it does not know how the callee views the call. There are many features in SIP that rely on this endpoint view information being known by the endpoints. Without the proper endpoint view information, such SIP features either become broken or are inaccessible by the endpoints.

Continuing with the B2BUA example, a recent solution that resolves the problem of incorporating a B2BUA between endpoints is known as the Endpoint View Header. In this instance, both the caller and callee endpoints embed their view of the call in a header call the "Endpoint-View" header which passes transparently through the network so that the endpoints can become aware of how the other endpoint views the call. However, this is a recent proposal and there are many endpoints available today that want to exist in a network that contains a B2BUA but do not implement support for the "Endpoint-View" header. A similar problem arises in connection with other SIP headers and extensions to SIP behaviour.

SUMMARY

It is, therefore, one aspect of the present invention to an endpoint enhancer that allows an endpoint to consume a network feature without natively supporting the extension or call-flow utilised by that feature. In accordance with at least some embodiments of the present invention, a SIP Endpoint Enhancer (SEE) is provided that augments the functionality of an endpoint, which may also be referred to as a UA, based on the device's native capabilities so that it meets the operability standard of the core of the network. SEE functionality depends upon and works in conjunction with a special purpose SIP proxy. As used herein a "special purpose proxy", "SIP proxy", or the like is used to refer to one or a combination of network elements of a SIP architecture which provides Registrar, Location Server, Event Routing, and Application Sequencing capabilities. A special purpose SIP proxy can serve as the entry point into a core (also referred to as an enterprise network) for users and application SIP requests. As a registrar and a location server, it is in the path of originating and terminating SIP requests. In addition, based on provisioned user profiles, the special purpose SIP proxy may invoke (route) an application sequence for both sides of a call (i.e., originating and terminating sides of the call).

Outside of this context, in some embodiments, the SEE does not enhance the functionality of SIP devices. Various SEE implementations may be deployed as add-on functionality to the special purpose SIP proxy.

In accordance with at least some embodiments of the present invention, a SEE may be implemented as a proxy, or as a B2BUA depending upon the type and extent of enhancement required by a particular device type. To support a variety of devices, there may be a variety of SEE implementations.

In addition to the functionality that the SEE it is able to provide, another aspect of the SEE role is where it appears in the overall structure of the network architecture and how it gets invoked on behalf of a device.

In accordance with at least some embodiments of the present invention, from an endpoint's perspective the endpoint it is unaware that it is being enhanced by a SEE and continues to operate in a normal fashion.

Thus, endpoint registration with a special purpose SIP proxy would proceed as normal. During registration the special purpose SIP proxy would inspect the standard User-Agent header (of the REGISTER) which contains information about the UA making the request. Based on the device type, the special purpose SIP proxy decides whether a particular SEE type and instance will be invoked for calls to and from that device for the lifetime of the device's attachment to the network. Unbeknown to other entities they will now interact with the device by its enhanced identity. Note that during registration no SEE is invoked, the endpoint registers as normal and the special purpose SIP proxy only identifies whether a SEE will be applied to subsequent SIP signaling.

RFC 3261, the entire contents of which are hereby incorporated herein by reference, states that the User-Agent header is optional in REGISTER requests, however, in order to be enhanced by a SEE, an endpoint MUST include the User-Agent header in REGISTER requests. RFC 3261 also states that UAs should make this header configurable, as is the case with many third-party endpoints. It is, therefore, the responsibility of the network administrator to ensure that endpoints are provisioned to populate the User-Agent header with a suitable value (i.e., a value that matches the special purpose SIP proxy mapping from device type to SEE).

In accordance with at least some embodiments of the present invention, heterogeneous collections of endpoints are supported whereby different device types within a network require different enhancement via different SEEs. Mechanisms may be provided which allows the special purpose SIP proxy to know that a particular device type requires a particular enhancement and supply that enhancement accordingly.

In accordance with at least some embodiments of the present invention, a SEE is invoked for all SIP methods, not just those that are sequenced. For example, SIP methods such as SUBSCRIBE and NOTIFY which are not sequenced, shall traverse the SEE prior to being sent for general SIP routing.

The REGISTER method provides one exception to this rule as has been described above. A SEE will not alter the REGISTER transaction call flow with the device, but as a consequence of assigning a SEE to the device, the SEE may decorate or alter the Registrar's information to reflect the capabilities of the enhanced device.

If possible, a SEE should be implemented as a simple proxy, though it is also acceptable to implement it as a B2BUA. A SEE B2BUA may initiate SIP transactions on behalf of an endpoint. The SEE should not be generating or terminating communication sessions on its own. The B2BUA capability may be needed, for example, to implement support for Out Of Dialog REFER for make call requests. A SEE may be implemented as a combination of a proxy and UA (e.g., to respond to subscription, send notification or publish events on behalf of the endpoint). For example, to publish dialog state events on behalf of an endpoint a SEE would act as a proxy (to see requests and responses) and a UA client (to actually publish the events).

For dialog creating transactions, if a SEE is required, embodiments of the present invention are adapted to dynamically insert the SEE into the call path before origination processing is begun for a user using that endpoint, or following termination processing for a user when contact resolution is being performed (when it is known which of possibly many registered devices will be involved in handling the call.) Additional details related to the concepts of origination and termination processing are well known to those skilled in the art and are described in U.S. Patent Publication No. 2009/0103518, the entire contents of which are hereby incorporated herein by reference.

The SEE functionality is employed based on the device being used, and not based on the user. A SEE, therefore, differs from application sequencing.

In accordance with at least some embodiments of the present invention, a SEE will be applied when calls are made to a device and calls originate from a device. SEE logic utilizes an indication from the special purpose SIP proxy regarding the intended "phase" for logic invocation; the special purpose SIP proxy will communicate the phase information along with the request. When invoking a SEE, the special purpose SIP proxy inserts two route headers in the request. In the first route header, which belongs to the SEE, the special purpose SIP proxy will insert the phase tag. The SEE uses this tag to determine whether it's being invoked to serve the originating device or the terminating device. On receiving a request with an originating phase tag, applications will invoke logic based on the device originating the request. On receiving a request with terminating phase tag, the SEE will invoke logic associated with the destination device of the request. The second route header belongs to the special purpose SIP proxy and will include a tag sent by the special purpose SIP proxy to itself to indicate completion of SEE origination processing or SEE termination processing.

Some examples of tags that may be used in accordance with embodiments of the present invention are displayed and described in the following table:

| Tag | Meaning | Expected behaviour |
| --- | --- | --- |
| Seeorig | This tag is sent by the special purpose SIP proxy to request origination side SEE processing. It is for the consumption of SEEs. | On receiving this tag in the route header, a SEE invokes logic associated with the calling device. |
| Seeterm | This tag is sent by the special purpose SIP proxy to request termination side SEE processing. It is for the consumption of SEEs. | On receiving this tag in the route header, a SEE invokes logic associated with terminating device. |
| Seeorigdone | This tag is sent by the special purpose SIP proxy to itself to indicate completion of origination processing by a SEE. | The special purpose SIP proxy inserts this tag in the second route header. The special purpose SIP proxy receives this tag back from SEE after it has performed the requested origination side processing |
| Seetermdone | This tag is sent by the special purpose SIP proxy to itself to indicate completion of termination processing by a SEE. | The special purpose SIP proxy inserts this tag in the second route header. The special purpose SIP proxy receives this tag back from SEE after it has performed the requested terminating side processing |

In accordance with at least some embodiments of the present invention, a SEE is applied as a consequence of successful device registration and in a manner that is transparent to the device concerned, this means:

It is possible to re-use the already established TLS connection.
  It simplifies boot-up and network attachment procedures.
  Allows third-party endpoints to use standard network attachment procedures such as obtaining SIP Outbound Proxy addresses from DHCP Servers regardless of the need for enhancement.
  It allows the attachment security functionality to be consistent for all devices. Firewalls, Authentication, Authorization mechanisms all remain consistent and centralized for devices that need enhancement as well as devices that do not.

A SEE may function as either a B2BUA or a proxy (and optionally record route) depending on the problem domain and the enhancement being applied. The enhancements can be written as a stand-alone SEE applications and could reside within a proxy such as the Aura Session Manager (SM) produced and sold by Avaya, Inc., or could be deployed to an Application Server alongside the applications themselves. To reduce latency it is recommended that SEE's are co-resident with a SM.

A SEE is not a Terminal Adapter (TA) and should not be considered as such. A TA is a SIP gateway that adapts non-SIP endpoints into the SIP network; in contrast a SEE enhances SIP endpoints. A TA registers on behalf of an endpoint, whereas a SEE does not. A TA may have specific hardware interface requirements for legacy devices, whereas a SEE may perform all of its functions as a software only entity.

A SEE should only enhance an endpoint's support for SIP signaling constructs (e.g., headers, methods, extensions, and network specific call-flows). A SEE should not contain any routing logic (i.e., route a request to another location, any business logic, or any unique call-processing or feature logic). Its role is to bring a device up to a common level of SIP signaling capability so that SIP applications residing on other SIP servers may treat all endpoint devices at a common level of abstraction.

In accordance with at least some embodiments of the present invention a method is provided, the method generally comprising:

receiving a first message from a first communication endpoint;

analyzing the first message to identify functional capabilities of the first communication endpoint;

determining functional requirements of a communication network that will be used by the first communication endpoint;

comparing the functional requirements of the communication network with the functional capabilities of the first communication endpoint;

determining that the functional capabilities of the first communication endpoint do not meet the functional requirements of the communication network;

based on determining functional capabilities of the first communication endpoint do not meet the functional requirements of the communication network, selecting at least one endpoint enhancer for the first communication endpoint;

receiving a second message from the first communication endpoint, wherein the second message is received in connection with establishing a communication session between the first communication endpoint and a communication device over the communication network; and inserting the selected at least one endpoint enhancer into a call path between the first communication endpoint and the communication device.

A computer-readable medium is also provided for storing instructions that, when executed by a processor, allow the processor to perform the above-identified method. The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to enhance the functionality of a communication endpoint or user agent.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
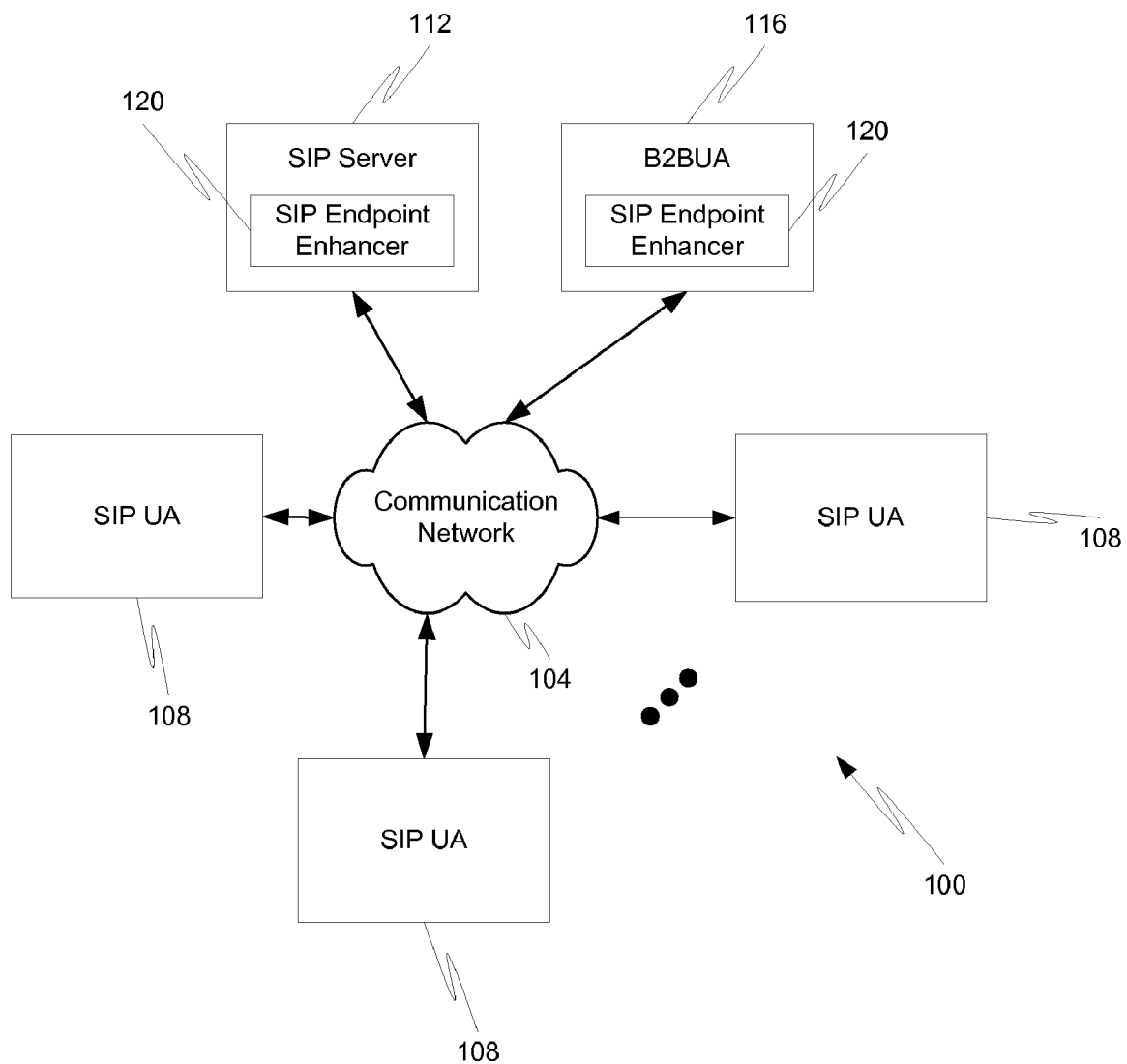
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 includes a communication network 104 adapted to interconnect one or more communication endpoints 108 (depicted as UAs) to the communication network 104 and any other devices connected thereto. As an example, the communication network 104 may comprise one or more SIP servers 112 connected thereto. In general, the communication endpoints 108 may be adapted to support video, audio, text, and/or data communications with other communication endpoints 108.

The SIP servers 112 may comprise one or more applications or feature modules that provide the network 104, and endpoints connected thereto, with various features/functions. In accordance with at least some embodiments of the present invention, the features and/or applications residing on SIP servers 112 connected to the network 104 define the "functional requirements" of the network 104, since these features and/or applications require a certain amount of cooperative interaction from the endpoints to fully execute the features and/or applications. The SIP server 112 may correspond to a SIP application or feature server that is adapted to provide SIP functions to one or more of the communication endpoints 108. One example of the SIP server 112 is the Aura Session Manager produced and sold by Avaya, Inc.

SIP servers 112 are applications that accept SIP requests and respond to them. A SIP server 112 should not be confused with a UA server or the client-server nature of the SIP protocol, which describe operations in terms of clients (originators of requests) and servers (originators of responses to requests). A SIP server 112 is a different type of entity. The types of SIP servers 112 discussed herein are logical entities. Actual SIP server 112 implementation may contain a number of server types, or may operate as different types of servers under different conditions. Because servers provide services and features to endpoints, they generally support TCP, TLS, and UDP for transport. One specific type of SIP server 112 is a proxy server. Other types of SIP servers 112 are also well known and some such examples may be discussed in further detail herein.

The communication network 104 may be any type of known communication medium or collection of communication mediums and may use any type of protocols to transport messages between endpoints or devices. The communication network 104 may include wired and/or wireless communication technologies. Examples of a communication network 104 include a Local Area Network (LAN), a Wide Area Network (WAN), the Internet, which is an example of a communication network 104 that constitutes an IP network consisting of many computers and other communication devices located all over the world, which are connected through many telephone systems and other means, a standard Plain Old Telephone System (POTS), an Integrated Services Digital Network (ISDN), the Public Switched Telephone Network (PSTN), an H.323 network, a Session Initiation Protocol (SIP) network, any network that will support the interconnection of SIP UA's through tunneling, adaptation, or other appropriate mechanisms, and any other type of packet-switched or circuit-switched network known in the art. In addition, it can be appreciated that the communication network 104 need not be limited to any one network type, and instead may be comprised of a number of different networks and/or network types.

Another example of a communication device that may be connected to the communication network 104 is a B2BUA 116. A B2BUA is a type of SIP device that receives a SIP request, then reformulates the request and sends it out as a new request. Responses to the request are also reformulated and sent back in the opposite direction. For example, a B2BUA device can be used to implement an anonymizer service in which two SIP UAs can communication without either party learning the other party's URI, IP address, or any other information.

Sometimes B2BUAs are employed to implement other SIP services. The most common form of B2BUA present in SIP networks is an Application Layer Gateway (ALG). Some firewalls have ALG functionality built in, which allows a firewall to permit SIP and media traffic while still maintaining a high level of security. However, the introduction of a B2BUA 116 to the network 104 has some fallbacks, such as disrupting endpoint view functionality.

Therefore, an endpoint enhancer 120, which is depicted as a SIP endpoint enhancer, may be provided to one or more devices connected to the communication network 104. In accordance with at least some embodiments of the present invention, the endpoint enhancer 120 may be provided on the SIP server 112 and/or the B2BUA 116, depending upon the nature of the endpoint enhancer 120 as well as the functional requirements of the communication network 104. The location of the endpoint enhancer 120 may also depend upon the functional capabilities of a communication endpoint 108.

In accordance with at least some embodiments of the present invention, a plurality of endpoint enhancers 120 may be provided on one or both of the SIP server 112 and B2BUA 116. When an endpoint 108 attempts to establish a communication session with another endpoint 108, an endpoint enhancer from the plurality of endpoint enhancers may be selected for insertion into the call path between the endpoints. The selection of such an endpoint enhancer may depend upon the functional capabilities of the endpoints 108 as well as the functional requirements of the communication network 104. As one example, if the communication network 104 supports an endpoint view function but the endpoint does not support the use of an "Endpoint-View" header, then an appropriate endpoint enhancer 120 may be selected to help the endpoint implement the endpoint view function provided by the communication network 104. The endpoint view function will be described in further detail herein, but those skilled in the art will appreciate that the invention is not so limited. Other examples of functions provided by a network 104 but not supported by an endpoint 108 connected to the network 104 may also be envisioned by those skilled in the art and it is understood that embodiments of the present invention also cover such examples.

Figure 2:
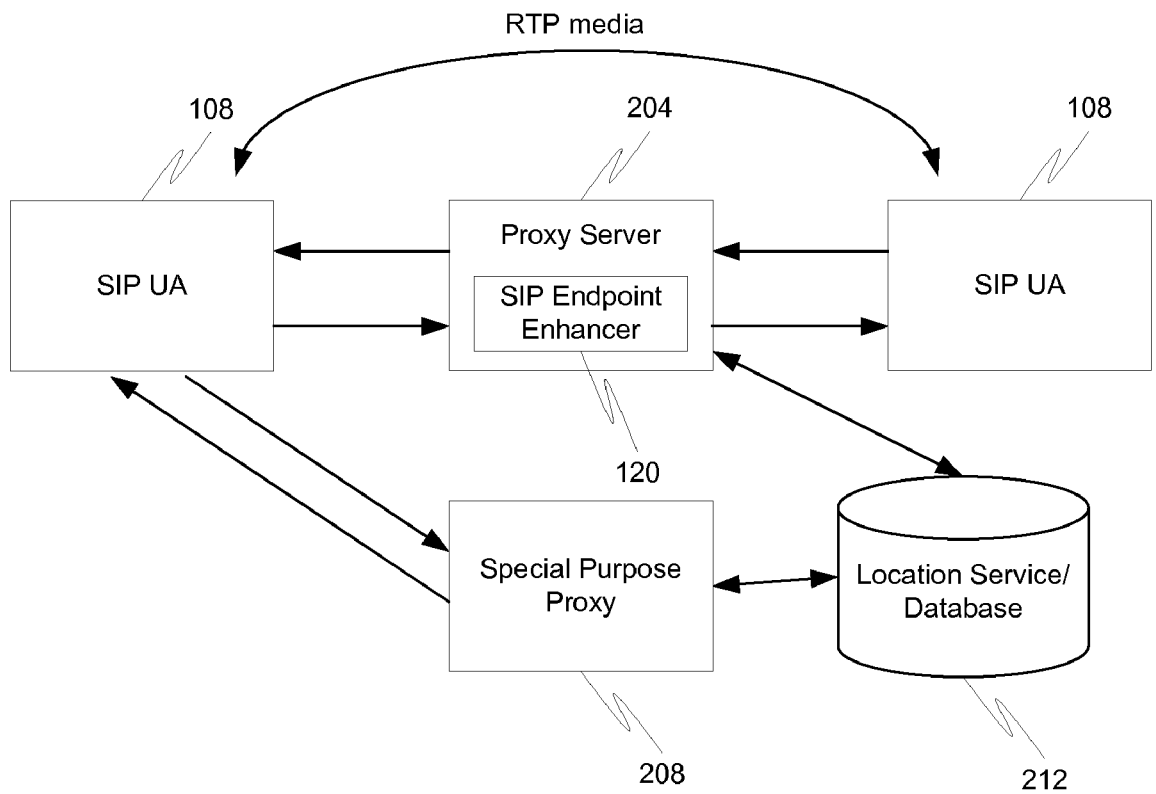
FIG. 2 is a block diagram depicting a first configuration of components of a communication system in accordance with at least some embodiments of the present invention.

FIG. 2 depicts further details of the interaction between components of a communication system in accordance with at least some embodiments of the present invention. More specifically, the SIP UAs 108 are depicted as being connected to a proxy server 204, which is one example of a SIP server 112. A SIP proxy server 204 may also include one or more endpoint enhancers 120. A SIP proxy server 204 receives a SIP request from a UA 108 or another proxy and acts on behalf of the UA 108 in forwarding or responding to the request. A proxy server 204 is not a B2BUA 116 since it is only allowed to modify requests and responses according to strict rules set out in RFC 3261. These rules preserve the end-to-end transparency of the SIP signaling while still allowing the proxy server 204 to provide valuable services and functions for the UA 108.

A SIP proxy server 204 typically has access to a database 212 or a location service to aid it in processing the request (e.g., determining the next hop). The interface between the proxy 204 and the location service 212 is not necessarily defined by the SIP protocol. A proxy 204 can use any number of types of databases to aid in processing a request. The data contained within the location service/database 212 may be populated and managed by a special purpose SIP proxy 208, which is also an example of a SIP server 112. In fact, although the special purpose SIP proxy 208 and the proxy server 204 are depicted as separate devices, one skilled in the art will appreciate that the special purpose SIP proxy 208 may perform the functions of the proxy server 204 in addition to performing registration services and other UA managements services performed in connection with updating the database 212.

In accordance with at least some embodiments of the present invention, the UA 108 is adapted to register with the special purpose SIP proxy 208 when it connects to the network 104. The special purpose SIP proxy 208 receives this registration information, usually via a registration-type message such as REGISTER, and updates the database 212 with information contained in the registration-type message.

Figure 3:
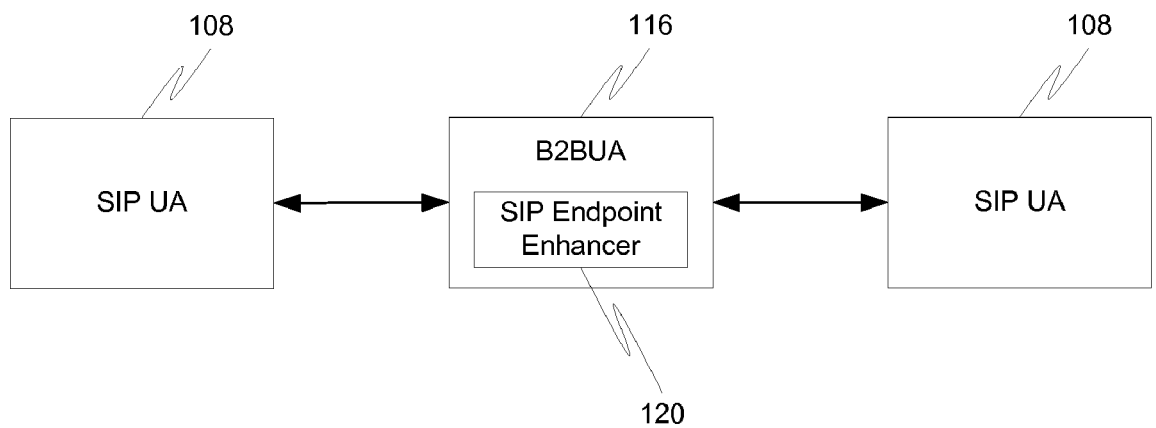
FIG. 3 is a block diagram depicting a second configuration of components of a communication system in accordance with at least some embodiments of the present invention.

FIG. 3 depicts another configuration of components in accordance with at least some embodiments of the present invention. More specifically, a B2BUA 116 may be inserted into the call path between SIP UAs 108. The B2BUA 116 may be positioned such that all control messages and media message (e.g., the RTP media stream) pass through the B2BUA 116. This is slightly different from the proxy configuration where RTP media is point-to-point and bypasses the proxy server 204.

Although certain depicted embodiments describe entities called proxies and B2BUAs that may include within them a SEE, one skilled in the art will appreciate that an alternative embodiment can be provided where the SEE is a stand-alone entity that is capable of acting as a B2BUA or a proxy. Thus, a SEE may encompass a B2BUA or proxy rather than the other way around.

Figure 4:
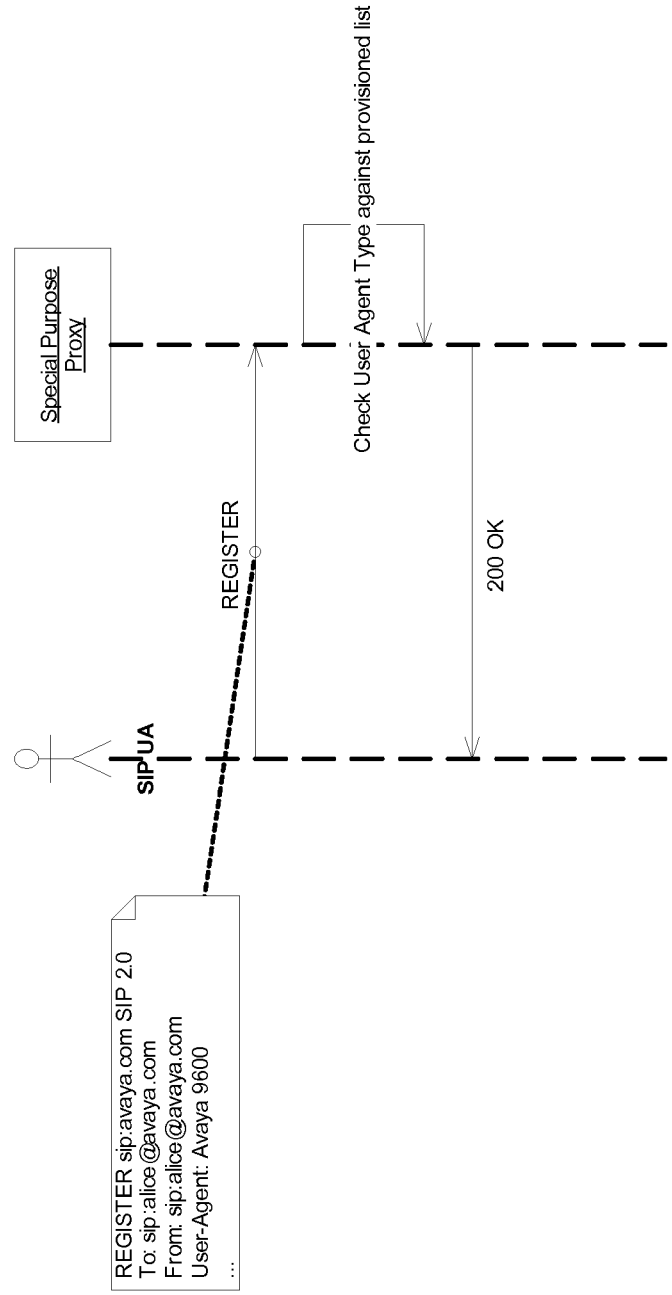
FIG. 4 is a signaling diagram depicting a registration method in accordance with at least some embodiments of the present invention.

Referring now to FIG. 4, an exemplary UA registration method will be described in accordance with at least some embodiments of the present invention. During registration, a SIP UA 108 generates a REGISTER message, or any other type of registration-type message if other communication protocols are employed. The generated message is transmitted to the special purpose SIP proxy 404, or any other type of application server 112 handling endpoint registration. The special purpose SIP proxy 404 analyzes the header of the received message to determine the functional capabilities of the SIP UA 108. More specifically, the special purpose SIP proxy 404 is able to inspect the message header which identifies the type, model, and other details of the endpoint device together with details from the provisioning database for that device. In accordance with at least some embodiments of the present invention, the SIP UA 108 is adapted to check the UA type against a provisioned (i.e., administrator provisioned) list which comprises a mapping of UA types against functional capabilities. Upon determining the functional capabilities of the SIP UA 108, the special purpose SIP proxy 404 generates a response, typically in the form of a 200 OK message, which is transmitted back to the SIP UA 108. The special purpose SIP proxy 404 may also be adapted to update any database 212 based on the registration of the UA 108.

In accordance with at least some embodiments of the present invention, the special purpose SIP proxy 404, after registering the UA 108, is able to make a decision whether the now registered UA 108 requires any endpoint enhancer 120 to adapt any of the SIP messages or call flow that the UA 108 will be involved with while it is connected to the communication network 104. This determination can cover both messages that will be sequenced through applications, such as INVITE, REFER, and MESSAGE as well as for any non-sequenced messages such as SUBSCRIBE. It should be noted that the message types which are and are not sequenced may vary from vendor to vendor. In accordance with at least some embodiments of the present invention, the special purpose SIP proxy 404 is adapted to select which endpoint enhancer 120 will be used based on the functional capabilities of the UA 108 as compared to the functional requirements of features provided by the communication network 104.

If the special purpose SIP proxy 404 determines that an endpoint enhancer 120 will be required to support a particular UA 108, then the special purpose SIP proxy 404 will select an appropriate endpoint enhancer 120 or set of endpoint enhancers 120 and dynamically insert such endpoint enhancer(s) 120 into a call path between the UA 108 and any other communication device, such as another endpoint or some other intermediate communication device.

Figure 5:
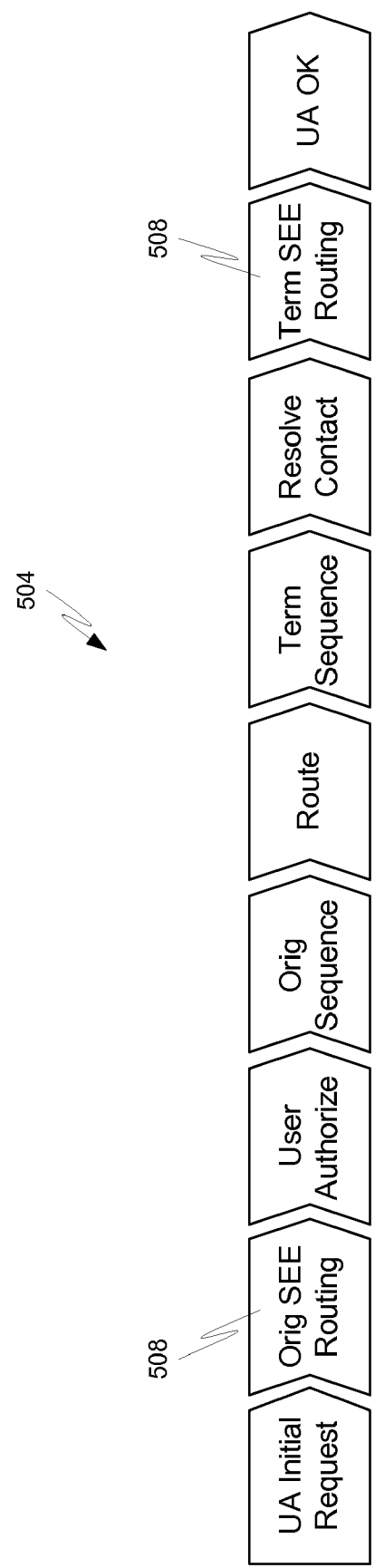
FIG. 5 is a block diagram depicting a call incorporating a SEE in accordance with at least some embodiments of the present invention.

As can be seen in FIG. 5, an endpoint enhancer 120, 508 may be inserted on the origination side of the call 504 or on the termination side of the call 504. More specifically, for messages that will be sequenced through applications, the endpoint enhancer 120, 508 will be invoked before origination processing has begun for a user using the UA 108 and/or following termination processing for a user when contact resolution has been performed (when it is known which of possibly many registered devices will be involved in the call handling). This insertion of an endpoint enhancer 120, 508 may be done for all SIP messages that initiate a dialog (with the exception of a REGISTER) and any other out of dialog messages. When an endpoint enhancer 120, 508 acts as a proxy (e.g., is provided by a proxy server 204 or more particularly is included as an application in the same code space of a proxy), the endpoint enhancer 120, 508 can, if needed, elect to stay in the signaling path of any respective dialog being established by the UA 108 and will, therefore, receive all subsequent messages to/from that UA 108 by performing standard record routing. In the event that the endpoint enhancer 120, 508 acts as a B2BUA (e.g., is provided by a B2BUA 116 or more particularly is included as an application in the same code space of a B2BUA), then the endpoint enhancer 120, 508 will always stay in the signaling path for the dialog due to the nature of B2BUAs.

In accordance with at least some embodiments of the present invention, endpoint enhancers 120 can be written as a stand-alone endpoint enhancer application and do not necessarily need to operate within the code space of the proxy or B2BUA (although they can).

The endpoint enhancer's 120 functionality is employed based on the device being used (i.e., the UA 108), and not based on the user of the device. It, therefore, differs from application sequencing, although it uses a similar routing mechanism. Because an endpoint enhancer 120 is applied as a consequence of successful device registration where the device type is identified, it is also possible to re-use the already established TLS connection of the UA 108. This simplifies the boot-up and network attachment procedures while allowing enhancement to be done on a per-device basis.

Because the initial connection and registration process is basic SIP, embodiments of the present invention allow for third party endpoints to use standard IP network attachment procedures such as obtaining SIP Outbound Proxy addresses from DHCP servers, regardless of the need for enhancement. Embodiments of the present invention also allow the attachment of security functionality to be consistent for all devices. Firewalls, Authentication, Authorization mechanisms all remain consistent and centralized for devices that need enhancement as well as devices that do not.

In accordance with at least some embodiments of the present invention, the ability to "hot deploy" endpoint enhancers 120 is also provided. More specifically, an endpoint enhancer 120 may be dynamically pluggable to a device on which it is being added. In accordance with at least some embodiments of the present invention, a plurality of endpoint enhancers 120 may already reside on a server 112 or B2BUA 116. When it is desired to add a new endpoint enhancer 120, the code for the new endpoint enhancer 120 can be added to the server 112 or B2BUA 116 without disrupting the operation of the already existing endpoint enhancers 120 or without disrupting the operation of the server 112 or B2BUA 116. This allows network administrators to easily and efficiently alter the endpoint enhancers 120 provided for a particular network. Thus, when a new SIP feature is introduced, it will be relatively simple to add a new endpoint enhancer 120 to the network, thereby allowing legacy endpoints to continue operating in the network and further benefit from the newly added SIP feature.

In accordance with at least some embodiments of the present invention, one or both of the origination and terminal side SEEs may be capable of performing a record-route function so that these entities will see all subsequent messages and be able to add/remove endpoint-view headers as necessary.

Figure 6:
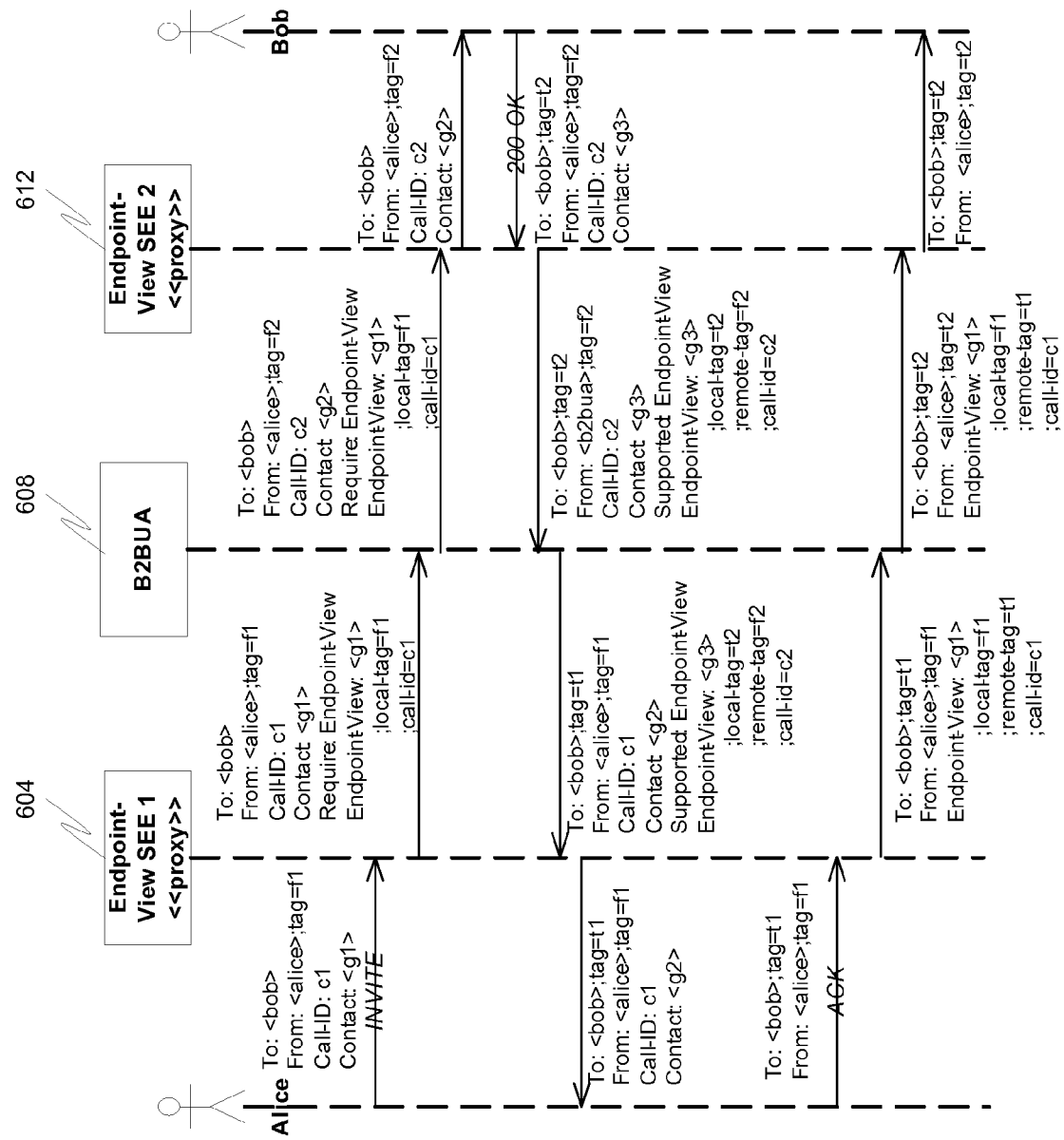
FIG. 6 is a signaling diagram depicting an endpoint-view SEE applied during call setup in accordance with at least some embodiments of the present invention.
Figure 7:
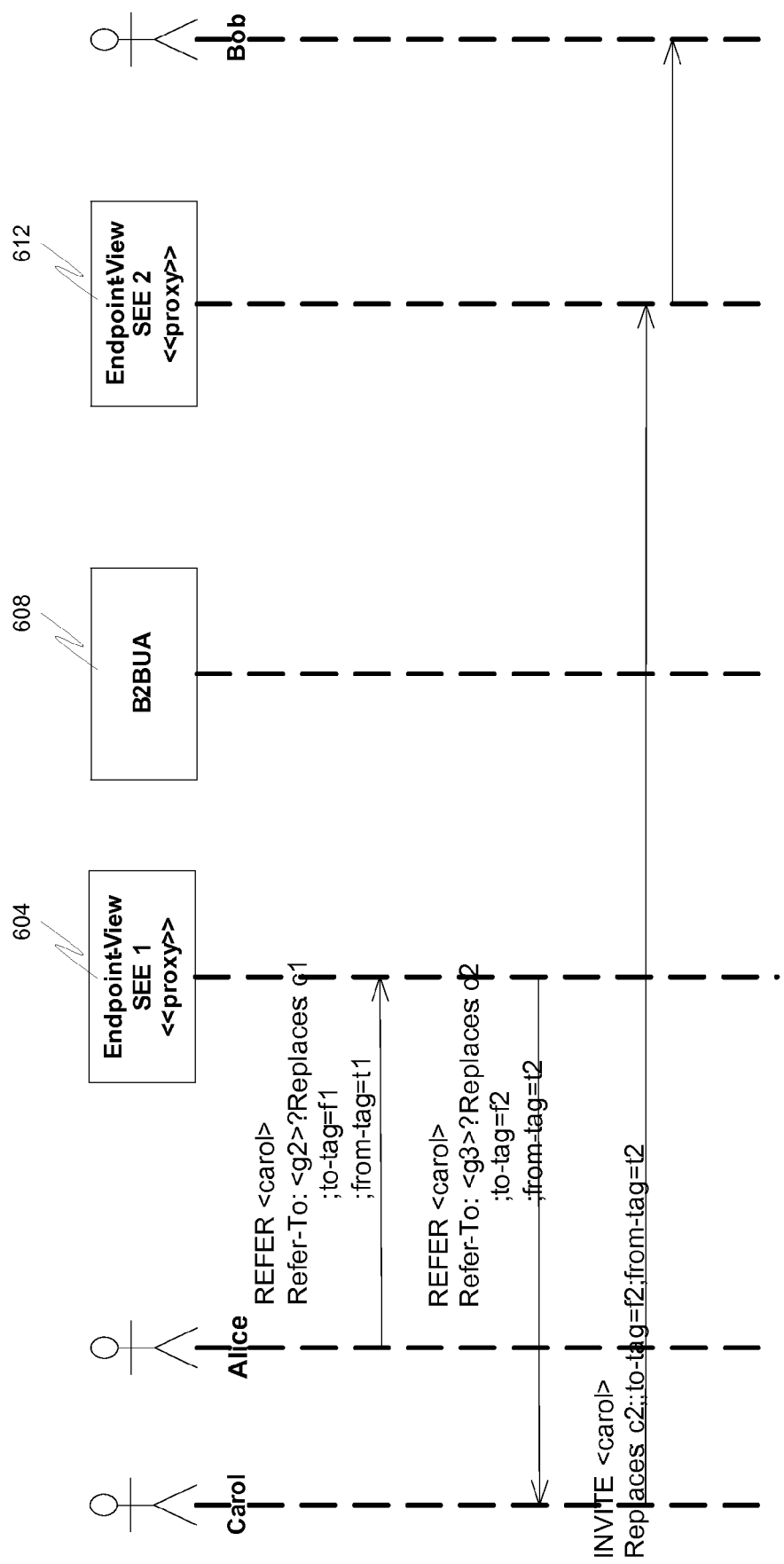
FIG. 7 is a signaling diagram depicting an endpoint-view SEE translating dialog IDs in accordance with at least some embodiments of the present invention.

With reference now to FIGS. 6 and 7, an exemplary endpoint-view endpoint enhancer 120 will be described in accordance with at least some embodiments of the present invention. Until the endpoint-view has been standardized, some SIP endpoints will not natively support this header. FIG. 6 we illustrate how an endpoint enhancer 120 could enhance an endpoint 108 in order to support the Endpoint-View header.

Initially, Alice makes a call to Bob. Both Alice and Bob are using devices that do not support Endpoint-View and therefore require enhancement. An instance of the endpoint enhancer 120 is applied (at the origination side) to serve Alice's calling device and a different instance of the SEE is applied (at the termination side) to serve Bob's called device. As per the recommendations outlined here the endpoint enhancer 120 is implemented as a simple record routing proxy. During call setup the endpoint enhancer 120 performs two roles:

Inserts the necessary headers as per the Endpoint-View header specification before then proxying.

Observes and remembers the opposite party's Endpoint-View information.

For brevity only the relevant portions of the SIP messages are illustrated in the FIGS. 6 and 7. As can be seen in FIG. 6, during call setup, Alice calls Bob and the endpoint generates a dialog initiating INVITE message in accordance with the functional capabilities of the endpoint. The origination side endpoint enhancer 604 identifies that endpoint-view information is needed and inserts such information into the message header. The message is then forwarded to a B2BUA 608, which forwards the INVITE message to the termination side endpoint enhancer 612 with the endpoint view header generated by the origination side endpoint enhancer 604, but also with new contact information of the B2BUA 608. The termination side endpoint enhancer 612 receives the endpoint view header information and analyzes the endpoint view header on behalf of Bob's UA, but only forwards the message to Bob's UA without that endpoint view header information. Thus, the call can be handled in accordance with the functional capabilities of Bob's UA.

Bob's UA generates a 200 OK message, with a header based on its functional capabilities, which do not include the functional capability of generating an endpoint-view header. The 200 OK message is transmitted to the termination side endpoint enhancer 612 which adds endpoint view information for Bob's UA to the message before forwarding it to the B2BUA 608. The B2BUA receives the message and forwards it to the origination side endpoint enhancer 604 which receives and analyzes the endpoint-view information contained in the endpoint view header on behalf of Alice's UA. The origination side endpoint enhancer 604 then forwards the generic version of the 200 OK message, without the endpoint view header, to Alice's UA.

This invokes Alice's UA to generate an ACK message with general routing and tag information. The ACK message is, again, sent to the origination side endpoint enhancer 604 which generates the endpoint-view header again and forwards it to the B2BUA 608 for transmission to its destination. The B2BUA 608 forwards the message with the endpoint-view header to the termination side endpoint enhancer 612, which analyzes the endpoint view information, removes it from the message and forwards the generic ACK message to Bob's UA. This completes the call setup. As can be seen, the endpoint enhancers 604, 612 are adapted to insert certain call headers on behalf of the endpoints they are servicing without disrupting service or message flow. Furthermore, the endpoints can obtain the benefits of the endpoint-view feature without natively supporting the endpoint-view header.

FIG. 7 depicts a similar scenario during the translation of dialog IDs. More specifically, Alice can elect to REFER Carol to Bob with the intent that Carol will replace Alice's call with Bob (e.g., a SIP transfer). Since Alice's device is not Endpoint-View capable it will populate the Replaces header (in the REFER) with the details of the dialog between that device and the B2BUA 608 application. However the endpoint enhancer on the origination side 604 is able to map and replace the dialog ID referenced in the REFER with the dialog ID observed in the Endpoint-View header during call setup; this being the dialog known to Bob's device. After the REFER message generated at Alice's UA has been properly processed by the origination side endpoint enhancer 604, the origination side endpoint enhancer 604 forward the reformatted REFER message to Carol's UA. This causes Carol's UA to generate an INVITE message, which is sent to the termination side endpoint enhancer 612 and ultimately sent to Bob's UA. As can be seen in FIG. 7, the call between Carol and Bob will not unnecessarily traverse the B2BUA 608.

While the above-described flowchart has been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for enhancing SIP endpoints. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   receiving a first message from a first SIP-enabled communication endpoint;
   analyzing the first message to identify SIP-based functional capabilities of the first SIP-enabled communication endpoint;
   determining SIP-based functional requirements of a communication network that will be used by the first SIP-enabled communication endpoint;
   comparing the SIP-based functional requirements of the communication network with the SIP-based functional capabilities of the first SIP-enabled communication endpoint;
   determining that the SIP-based functional capabilities of the first SIP-enabled communication endpoint do not meet the SIP-based functional requirements of the communication network;
   based on determining that the SIP-based functional capabilities of the first SIP-enabled communication endpoint do not meet the SIP-based functional requirements of the communication network, selecting at least one endpoint enhancer for the first SIP-enabled communication endpoint, the at least one endpoint enhancer being configured to enhance SIP capabilities of the first SIP-enabled communication endpoint;
   receiving a second message from the first SIP-enabled communication endpoint, wherein the second message is received in connection with establishing a communication session between the first SIP-enabled communication endpoint and a communication device over the communication network; and
   inserting the selected at least one endpoint enhancer into a call path between the first SIP-enabled communication endpoint and the communication device, thereby enhancing the SIP-based functional capabilities of the first SIP-enabled communication endpoint to at least meet the SIP-based functional requirements of the communication network, wherein enhancing the SIP-based functional capabilities of the first SIP-enabled communication endpoint comprises adding one or more SIP headers.

2. The method of claim 1, wherein the communication network comprises a SIP network, and wherein the communication device comprises a second SIP-enabled communication endpoint in the SIP network.

3. The method of claim 1, further comprising:
   determining that the second message is a message that will be sequenced through at least one application; and
   invoking the selected at least one endpoint enhancer following termination processing for a user when contact resolution has been performed.

4. The method of claim 3, wherein the second message comprises one or more of an INVITE message, a REFER message, and a MESSAGE message.

5. The method of claim 1, wherein the first message comprises a REGISTER message and wherein the second message comprises at least one of a dialog initiating SIP message, other than a REGISTER message, and an out of dialog message between the first SIP-enabled communication endpoint and the communication device.

6. The method of claim 1, wherein the selected at least one endpoint enhancer stays in a signalling path of any dialog being established between the first SIP-enabled communication endpoint and the communication device.

7. The method of claim 1, wherein all messages of the communication session are received by the selected at least one endpoint enhancer.

8. The method of claim 1, further comprising:
   receiving a third message from the first SIP-enabled communication endpoint; and
   re-using an established TLS connection between the first SIP-enabled communication endpoint and the communication network to again insert the selected at least one endpoint enhancer for the first SIP-enabled communication endpoint.

9. The method of claim 1, wherein the selected at least one endpoint enhancer is selected from a plurality of endpoint enhancers, wherein each of the plurality of endpoint enhancers are used to provide SIP-enabled endpoints with different SIP-based functions to meet the SIP-based functional requirements of the communication network.

10. The method of claim 9, wherein the selected at least one endpoint enhancer is dynamically added to the plurality of endpoint enhancers without disrupting operation of other endpoint enhancers in the plurality of endpoint enhancers.

11. A communication device adapted to receive a registration-type message from a first SIP-enabled communication endpoint, analyze the registration-type message to identify SIP-based functional capabilities of the first SIP-enabled communication endpoint, determine SIP-based functional requirements of a communication network that will be used by the first SIP-enabled communication endpoint, compare the SIP-based functional requirements of the communication network with the SIP-based functional capabilities of the first SIP-enabled communication endpoint, determine that the SIP-based functional capabilities of the first SIP-enabled communication endpoint do not meet the SIP-based functional requirements of the communication network, select an endpoint enhancer for the first SIP-enabled communication endpoint, and insert the selected endpoint enhancer into a call path between the first SIP-enabled communication endpoint and a second communication endpoint, thereby enhancing the SIP-based functional capabilities of the first SIP-enabled communication endpoint to at least meet the SIP-based functional requirements of the communication network, wherein enhancing the SIP-based functional capabilities of the first SIP-enabled communication endpoint comprises adding one or more SIP headers.

12. The communication device of claim 11, wherein the communication network comprises a SIP network, and wherein the second communication endpoint resides in the SIP network.

13. The communication device of claim 11, wherein the selected endpoint enhancer is inserted in a call origination side of a call.

14. The communication device of claim 11, wherein the registration-type message comprises a REGISTER message.

15. The communication device of claim 11, wherein the selected endpoint enhancer stays in a signalling path of any dialog being established between the first SIP-enabled communication endpoint and the second communication endpoint.

16. The communication device of claim 11, comprising memory including SIP proxy code and the selected endpoint enhancer, the communication device further comprising a processor for executing contents of its memory.

17. The communication device of claim 16, wherein the selected endpoint enhancer is a stand-alone application that is not part of the SIP proxy code.

18. The communication device of claim 16, wherein the selected endpoint enhancer is part of the SIP proxy code.

19. The communication device of claim 11, wherein the communication device operates as a Back-to-Back User Agent between the first SIP-enabled communication endpoint and the second communication endpoint and wherein the selected endpoint enhancer resides on the Back-to-Back User Agent.

20. A computer program product comprising computer executable instructions stored onto a non-transitory computer readable medium which, when executed by a processor of a computer, cause the processor to execute a method, the method comprising:
   receiving a first message from a first SIP-enabled communication endpoint;
   analyzing the first message to identify SIP-based functional capabilities of the first SIP-enabled communication endpoint;
   determining SIP-based functional requirements of a communication network that will be used by the first SIP-enabled communication endpoint;
   comparing the SIP-based functional requirements of the communication network with the SIP-based functional capabilities of the first SIP-enabled communication endpoint;
   determining that the SIP-based functional capabilities of the first SIP-enabled communication endpoint do not meet the SIP-based functional requirements of the communication network;
   based on determining that the SIP-based functional capabilities of the first SIP-enabled communication endpoint do not meet the SIP-based functional requirements of the communication network, selecting at least one endpoint enhancer for the first SIP-enabled communication endpoint;
   receiving a second message from the first SIP-enabled communication endpoint, wherein the second message is received in connection with establishing a communication session between the first SIP-enabled communication endpoint and a communication device over the communication network; and
   inserting the selected at least one endpoint enhancer into a call path between the first SIP-enabled communication endpoint and the communication device, thereby enhancing the SIP-based functional capabilities of the first SIP-enabled communication endpoint to at least meet the SIP-based functional requirements of the communication network, wherein enhancing the SIP-based functional capabilities of the first SIP-enabled communication endpoint comprises adding one or more SIP headers.

21. The computer program product of claim 20, wherein the computer readable medium comprises the selected at least one endpoint enhancer and SIP proxy logic.

22. The computer program product of claim 21, wherein the selected at least one endpoint enhancer is part of the SIP proxy logic.

23. The computer program product of claim 20, wherein the computer readable medium comprises the selected at least one endpoint enhancer and Back-to-Back User Agent logic.

* * * * *